United States Patent
Suzuki (10) Patent No.: US 7,390,054 B2
(45) Date of Patent: Jun. 24, 2008

(54) VEHICLE SLIDE DOOR APPARATUS

(75) Inventor: Nobuji Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 245 days.

(21) Appl. No.: 11/216,030

(22) Filed: Sep. 1, 2005

(65) Prior Publication Data

US 2006/0049667 A1    Mar. 9, 2006

(30) Foreign Application Priority Data

Sep. 3, 2004    (JP) .............................. 2004-257092

(51) Int. Cl.
B60J 5/06    (2006.01)
(52) U.S. Cl. .................................. 296/187.12; 296/155
(58) Field of Classification Search .................. 296/155, 296/187.12

See application file for complete search history.

(56) References Cited

U.S. PATENT DOCUMENTS

| | | | | |
|---|---|---|---|---|
| 4,110,934 A | * | 9/1978 | Zens | 49/218 |
| 4,433,507 A | * | 2/1984 | Chikaraishi | 49/213 |
| 5,896,704 A | * | 4/1999 | Neag et al. | 49/209 |
| 6,328,374 B1 | * | 12/2001 | Patel | 296/155 |

FOREIGN PATENT DOCUMENTS

JP    11-157339    6/1999

* cited by examiner

*Primary Examiner*—Dennis H Pedder
(74) *Attorney, Agent, or Firm*—Smith, Gambrell & Russell LLP (57) ABSTRACT

The present invention provides a vehicle slide door apparatus including an opening formed on a side portion of a vehicle body; a slide door which opens and closes the opening by moving in the fore-and-aft direction; an upper rail extending along an upper side of the opening; and an upper arm having one end guided by the upper rail in the fore-and-aft direction and the other end fixed to the slide door, wherein an engaging device provided on the upper arm and an engaged device provided on the vehicle body engages in case of side collision of the vehicle so as to effectively secure the safety for passengers by decreasing the deformation if collided.

15 Claims, 6 Drawing Sheets

VEHICLE SLIDE DOOR APPARATUS

CROSS REFERENCE TO RELATED APPLICATIONS

The disclosure of Japanese Application No.2004-257092 filed in Sep. 3, 2004 including the specification, drawings, and abstract is incorporated herein by reference in its entirety.

BACKGROUND OF THE INVENTION

1. Field of the Invention

The present invention relates to a vehicle slide door apparatus for opening and closing an opening formed on a side portion of a vehicle body by a slide door which moves in a fore-and-aft direction.

2. Description of Related Art

Hitherto, in a motor vehicle of one-box type or the like, the one in which an opening formed on a side portion of a vehicle body is opened and closed by a slide door is in common use. The slide door is adapted to be guided in the fore-and-aft direction by three rails provided in parallel (for example, see JP-A-11-157339). An upper rail and a lower rail of the three rails are provided on the vehicle body, and a remaining center rail is provided on the slide door.

The upper rail and the slide door are connected by an upper arm which extends substantially in a lateral direction, and the lower rail and the slide door is connected by a lower arm which extends substantially in the lateral direction. The upper rail and the lower rail extend in the fore-and-aft direction along an upper side and a lower side of the opening of the vehicle body so as to guide one end of each arm in the fore-and-aft direction. The other end of each arm is fixed to a pillar section of the slide door.

In case of side collision of the vehicle, a load is applied to a vertical center portion of the slide door in the direction toward a cabin, and hence the center portion thereof is bent and deformed so as to project toward the cabin. Since the slide door is guided by arms which can move freely in the fore-and-aft direction with respect to the vehicle body, the door body cannot be arrested sufficiently by the vehicle body in case of the side collision in comparison with a door which is guided by a hinge fixed to the vehicle body side. Accordingly, an intrusion amount of the slide door toward the cabin increases, and hence a safety securement of a passenger becomes relatively difficult. Therefore, a structure stiffness of the door body and the vehicle body portion around the door is increased to secure the safety of the passenger, and consequently, there arises such a problem as a weight of the vehicle body and a manufacturing cost increases.

SUMMARY OF THE INVENTION

In view of such circumstances, it is an object of the present invention to provide a vehicle slide door apparatus in which an amount of an intrusion of the slide door toward a cabin in case of a side collision of a vehicle can be reduced.

In order to achieve the object, the first aspect of the invention comprises an opening formed on a side portion of a vehicle body, a slide door which opens and closes the opening by moving in a fore-and-aft direction, a rail extending along an upper side or an lower side of the opening; and an arm having one end guided by the rail in the fore-and-aft direction and the other end fixed to the slide door, wherein an engaging device provided on the arm and an engaged device provided on the vehicle body engages in case of side collision of the vehicle.

According to the first aspect of the invention, since the engaging device and the engaged device engages with each other in case of side collision of the vehicle, the slide door is arrested by the vehicle body side, and hence the instruction amount of the slide door into the cabin can be reduced.

Accordingly, the safety of the passenger can be improved. The intrusion of the slide door can be controlled effectively without increasing stiffness of the slide door and portion around the door. Therefore, number of components and weight of the slide door and the vehicle body can be reduced, whereby a reduction of the vehicle weight and manufacturing cost can be achieved.

Preferably, the engaging device is a hole formed on the arm, and the engaged device is a hook formed on the vehicle body so as to project therefrom.

Accordingly, when the slide door is deformed in case of side collision of the vehicle, the hook formed on the vehicle body so as to project therefrom engages the hole formed on the arm, and the slide door is arrested by the vehicle body. Since the hole on the arm and the hook on the vehicle body are normally in an isolated state, it does not impair an opening/closing operation of the door.

Preferably, the arm is an upper arm which guides the upper portion of the slide door, and the hook is formed so as to project upward and the hole is disposed upwardly of the hook.

Accordingly, in case of side collision of the vehicle body, a vertical center portion of the slide door moves toward the center of the cabin, and the slide door is bent into substantially an angular C-shape. At this time, the upper portion of the slide door moves downward, and hence the upper arm moves downward, whereby the hook is received in the hole of the upper arm. Subsequently, the movement of the upper arm with respect to the vehicle body is restrained.

Preferably, the hook is formed on a receiving bracket for receiving a catcher pin of the arm.

Accordingly, since the hook is formed on the receiving bracket for the catcher pin, the component can be shared and hence further reduction of the weight is achieved. The receiving bracket has a relatively high strength since it is designed to resist an impact of the opening/closing operation of the door, and is advantageous in terms of strength in case of side collision.

Preferably, the arm includes a projecting plate having the catcher pin and projecting from the arm body, and the projecting plate is formed with the hole.

Accordingly, since the projecting plate having the catch pin is formed with the hole, the hole can be formed easily, and deterioration of rigidity and strength of the arm itself due to formation of the hole on the arm body can be avoided, whereby it is very advantageous for a practical use.

In this manner, according to the vehicle slide door apparatus of the present invention, the amount of intrusion of the slide door toward the cabin in case of side collision can be reduced. Simultaneously, the safety of the passenger can be increased, and the weight and the manufacturing cost of the vehicle can be reduced.

BRIEF DESCRIPTION OF THE DRAWINGS

FIG. 6 is a schematic diagram of the vehicle body showing a positional relation between a bracket for a catch pin, an upper rail, and so on.

DESCRIPTION OF PREFERRED EMBODIMENTS

Figure 1:
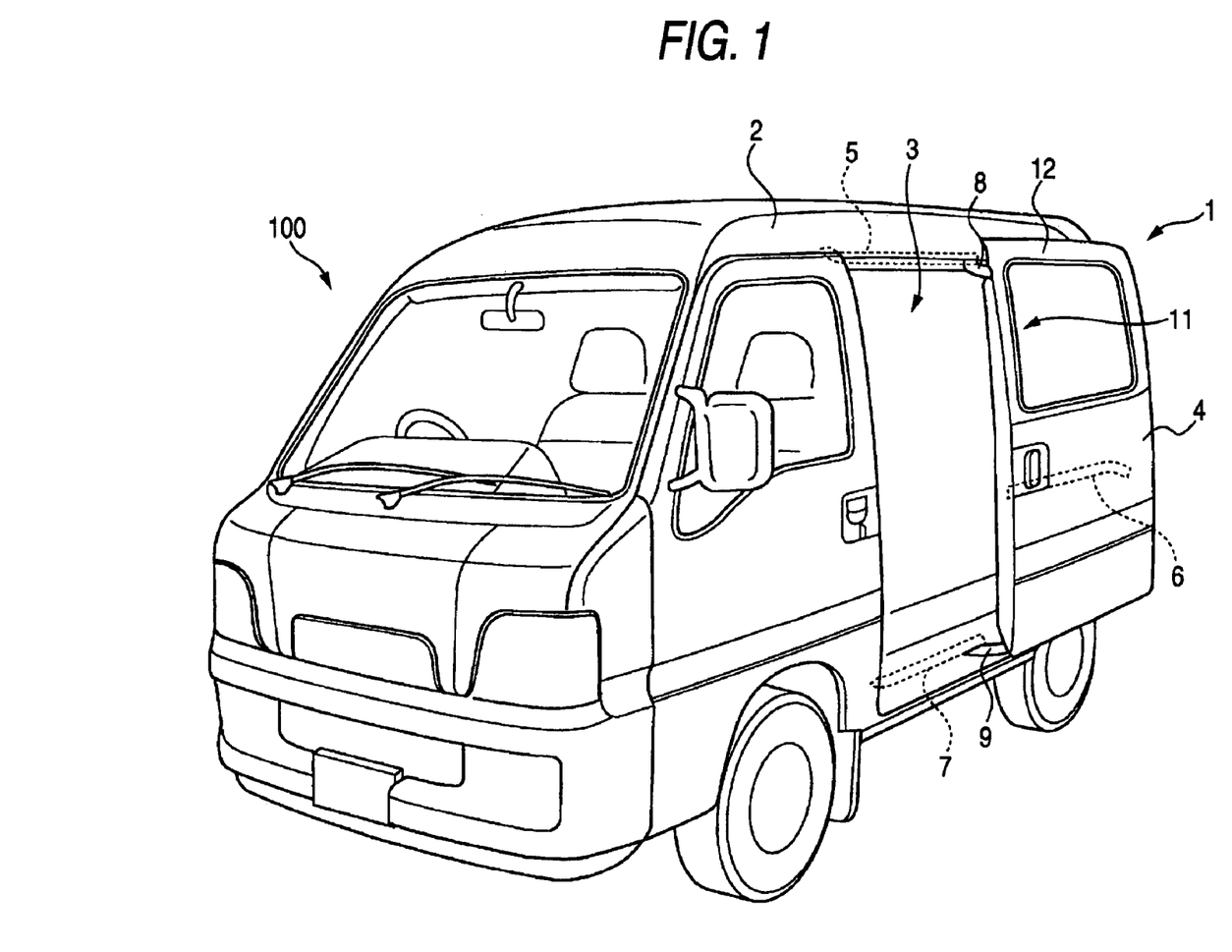
FIG. 1 is a schematic perspective view of an appearance of a motor vehicle having a slide door apparatus.
Figure 2:
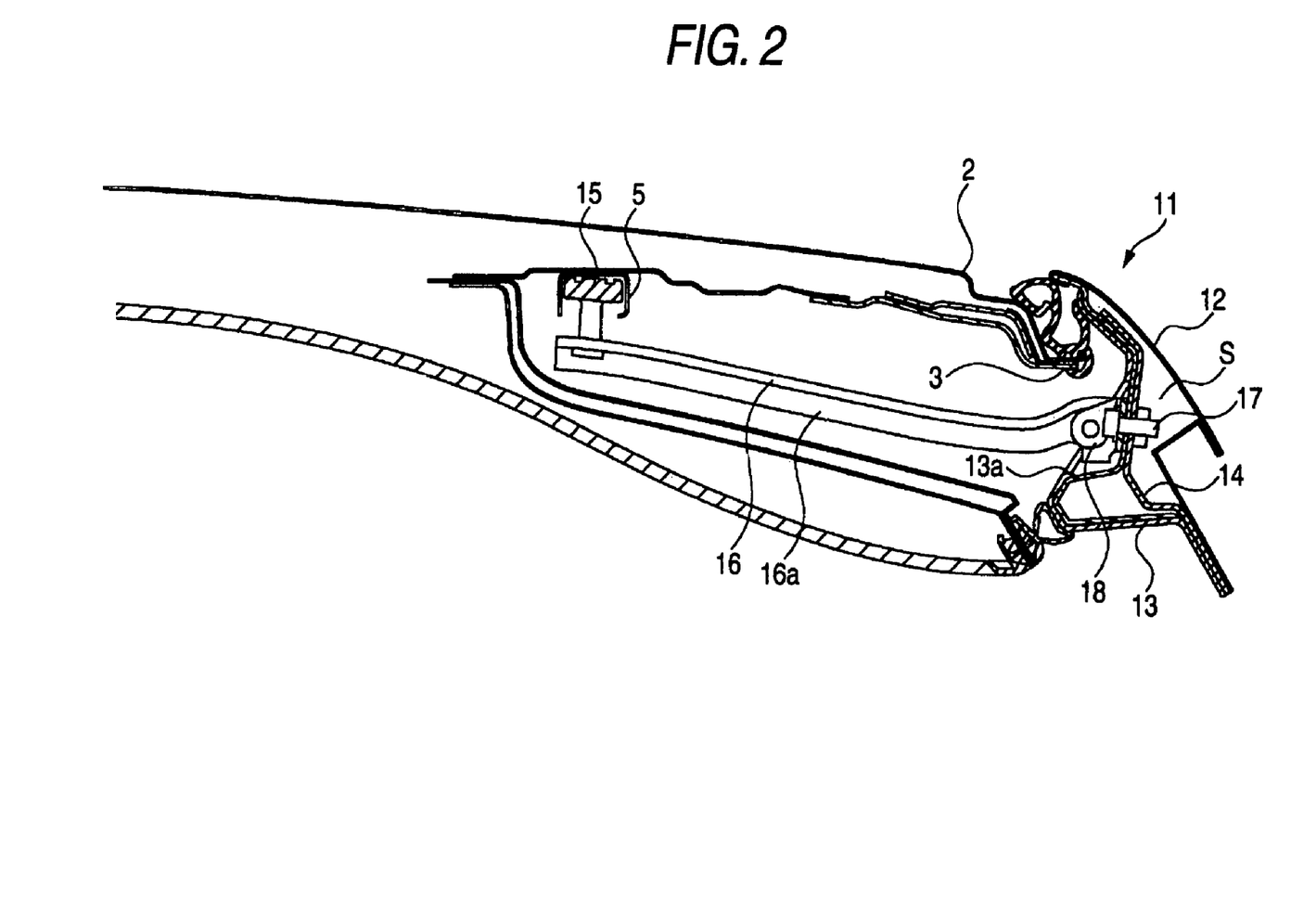
FIG. 2 is a front cross-sectional view of a front portion of a slide door apparatus.
Figure 3:
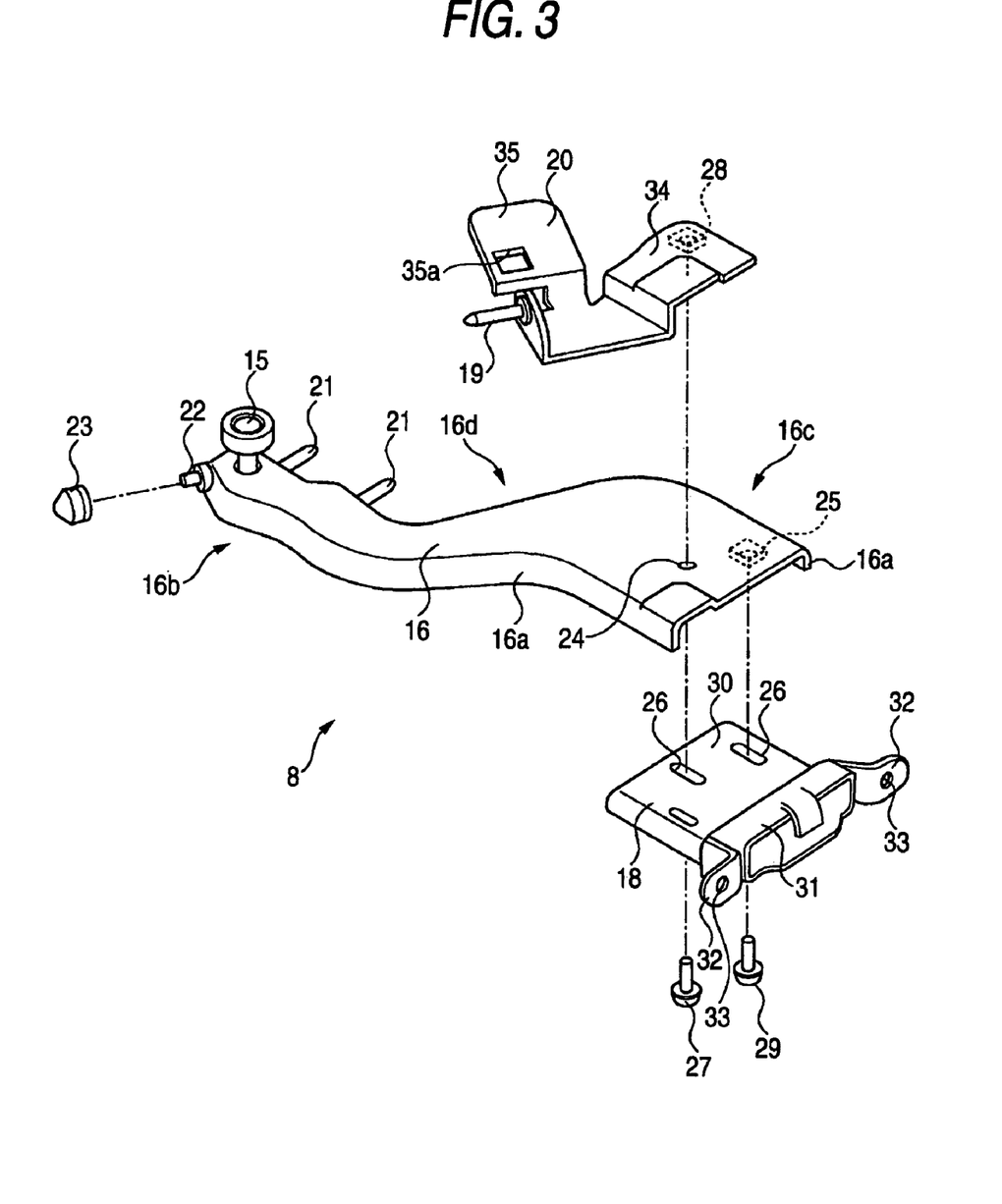
FIG. 3 is an exploded perspective view of an upper arm.
Figure 4:
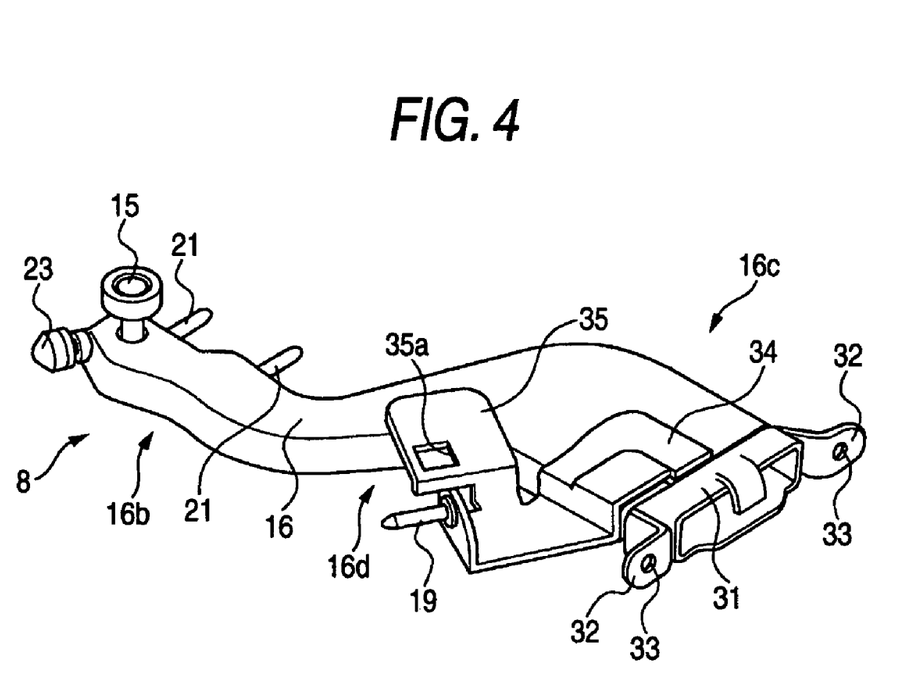
FIG. 4 is a perspective view of an appearance of the upper arm.
Figure 5:
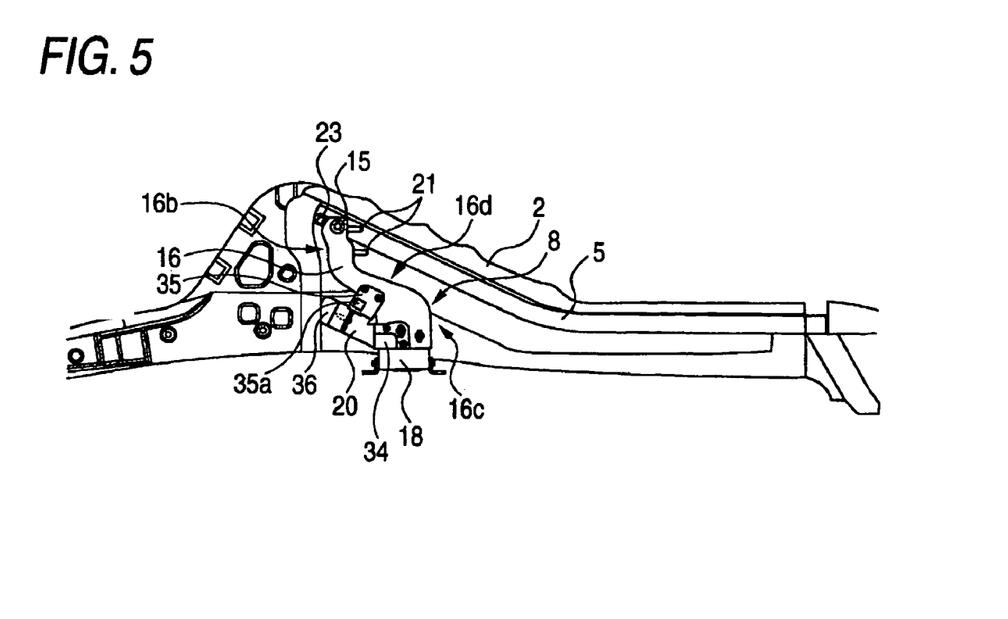
FIG. 5 is a general top view of the upper arm and a vehicle body.
Figure 6:
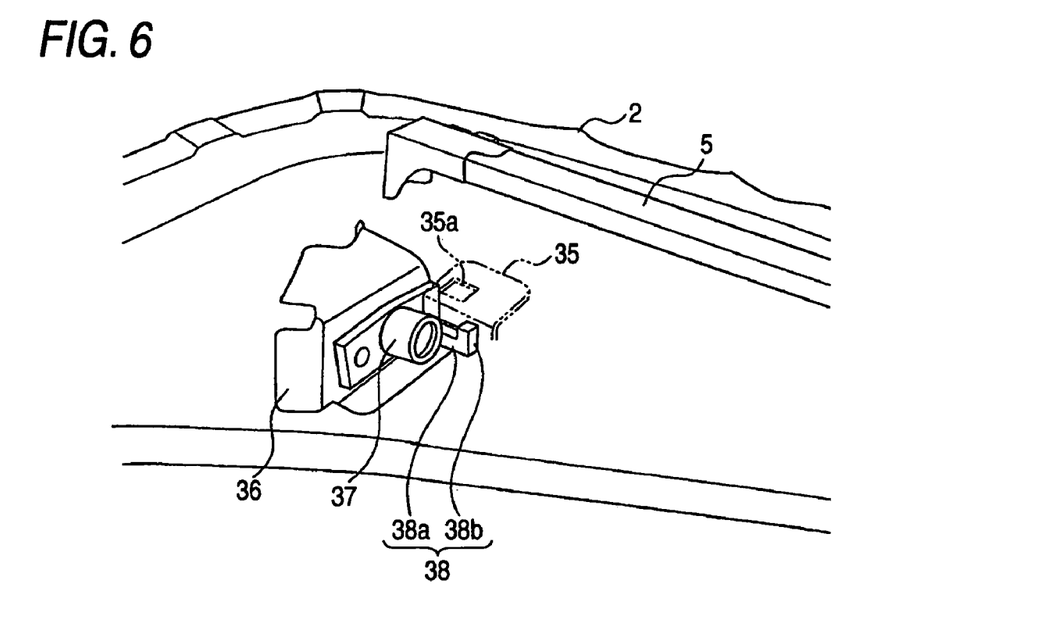
Figure 7:
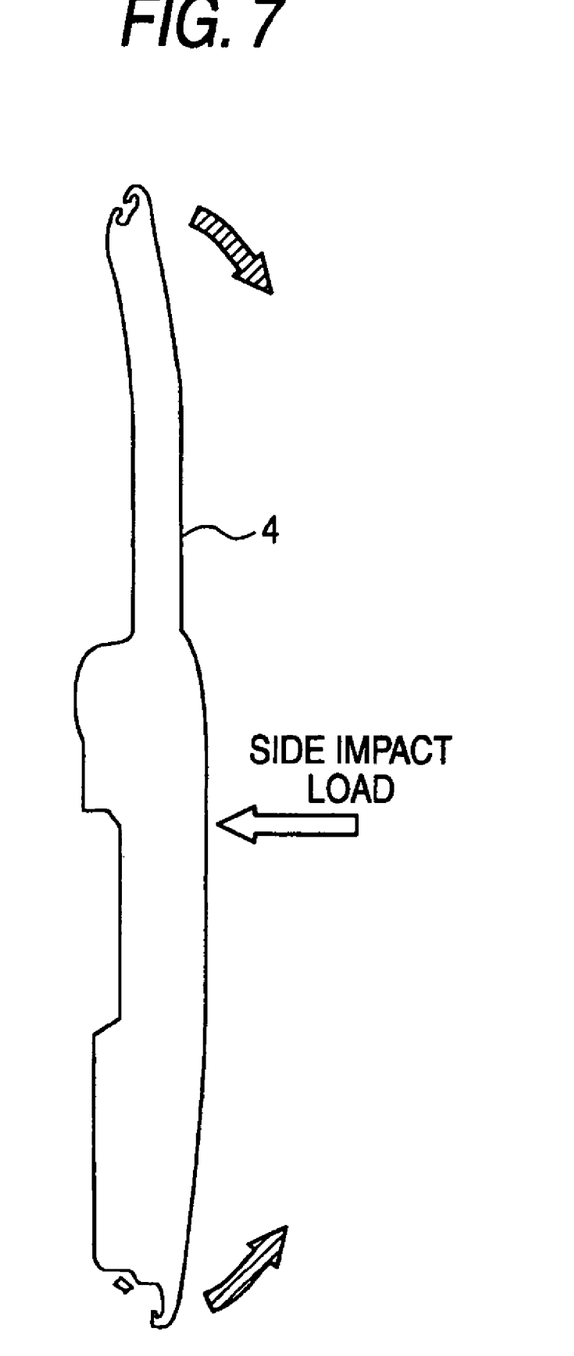
FIG. 7 is an explanatory drawing showing a behavior of a slide door in case of a side collision of the vehicle.

FIG. 1 to FIG. 7 show an embodiment of the present invention. FIG. 1 is a schematic perspective view of an appearance of a motor vehicle having a slide door apparatus; FIG. 2 is a front cross-sectional view of a front portion of a slide door apparatus; FIG. 3 is an exploded perspective view of an upper arm; FIG. 4 is a perspective view of the appearance of the upper arm; FIG. 5 is a general top view of the upper arm and a vehicle body; FIG. 6 is a schematic diagram of the vehicle body showing a positional relation between a bracket for a catch pin, an upper rail, and so on; and FIG. 7 is an explanatory drawing showing a behavior of a slide door in case of a side collision of the vehicle.

As shown in FIG. 1, a vehicle slide door apparatus 1 is used for a one-box type motor vehicle 100 for opening and closing an opening 3 formed on a side of a vehicle body 2 by a square slide door 4 moving in the fore-and-aft direction. The vehicle slide door apparatus 1 is adapted to guide the slide door 4 in the fore-and-aft direction by three rails including an upper rail 5, a center rail 6, and a lower rail 7 extending in the fore-and-aft direction.

In this embodiment, the upper rail 5 and the lower rail 7 are disposed on the vehicle body 2, and the center rail 6 is disposed on the slide door 4. As shown in FIG. 1, the upper rail 5 extends along an upper side of the opening 3, and the lower rail 7 extends along a lower side of the opening 3. The upper rail 5 and the slide door 4 are connected by an upper arm 8 extending in the lateral direction, and the lower rail 7 and the slide door 4 are connected by a lower arm 9 extending in the lateral direction. The center rail 6 and the rear peripheral edge of the opening 3 of the vehicle body 2 are connected by a center arm, not shown.

As shown in FIG. 1, each one of ends of the upper arm 8 and the lower arm 9 is guided in the fore-and-aft direction by the upper rail 5 and the lower rail 7 respectively. The other ends of the upper arm 8 and the lower arm 9 are fixed to a pillar section 11 which defines the front peripheral edge of the slide door 4. The pillar section 11 extends in the vertical direction and, as shown in FIG. 2, defines a closed cross-section S by an outer panel 12 on the exterior side and an inner panel 13 on the cabin side at the upper end side. Accordingly, rigidity and strength of the peripheral edge of the slide door 4 is efficiently secured. Disposed between the outer panel 12 and the inner panel 13 is a pillar reinforce 14 so as to divide the closed cross-section S.

As shown in FIG. 2, the inner panel 13 is formed with an insertion hole 13*a* in which the other end of the upper arm 8 is inserted. The other end of the upper arm 8 is fixed to the pillar reinforce 14. The upper arm 8 is formed into substantially a flat shape in a front view (see FIG. 2), and is formed so as to increase in a widthwise direction from one end (cabin side) to the other end (exterior side) (see FIG. 3).

As shown in FIG. 3, the upper arm 8 includes an arm body 16 having a roller 15 to be engaged with the upper rail 5 at one end, a fastening portion 18 connected to the other end of the arm body 16 and fastened to the pillar reinforce 14 by a bolt 17, and an arm guiding member 20 provided on top of the other end of the arm body 16 and having a catch pin 19 projecting obliquely toward the front.

The arm body 16 is formed into a plate shape extending substantially in the lateral direction, and is formed with flanges 16*a* projecting downward from the front edge and the rear edge. As shown in FIG. 4, the arm body 16 includes one end portion 16*b* extending at one end substantially in the lateral direction, the other end portion 16*c* formed on the rear side of the one end portion 16*b* and extending substantially in the lateral direction at the other end, and a curved portion 16*d* connecting the one end portion 16*b* and the other end portion 16*c*. In this embodiment, the curved portion 16*d* is formed so as to increase in widthwise dimension toward the other end.

As shown in FIG. 3, two stopper pins 21 extending substantially in parallel with each other are secured on the lower portion on the one end of the arm body 16 so as to project rearward at a distance in the lateral direction. Formed at the front portion on the one end of the arm body 16 is a projecting pin 22 projecting obliquely forward toward the cabin. A cap 23 is attached to the projecting pin 22 so as to come into contact with a panel on the side of the vehicle body 2, when the slide door 4 is moved to the frontmost position as shown in FIG. 5.

Provided on top of the one end of the arm body 16 is a roller 15 to be engaged with the upper rail 5. In this embodiment, as shown in FIG. 2, the upper rail 5 is provided with a portion opening downward and the roller 15 projecting from the upper surface of the upper arm 8 through the opening is fitted inside the upper rail 5. The roller 15 comes into abutment with the side wall of the upper rail 5 and rotates about substantially the vertical direction.

As shown in FIG. 3, a bolt insertion hole 24 and a weld nut 25 for fixation with the fastening portion 18 are provided on the other end of the arm body 16. The fastening portion 18 is formed with two long holes 26 elongated in the longitudinal direction of the arm 8 corresponding to the insertion hole 24 and the weld nut 25. A bolt 27 to be inserted into the bolt insertion hole 24 is screwed into a weld nut 28 secured to the lower surface of the arm guiding member 20. A bolt 29 to be inserted into a different long hole 26 from the long hole 26 in which the bolt 27 is inserted is screwed into the weld nut 25 secured to the lower surface of the arm body 16. In other words, the arm body 16 and the fastening portion 18 can be assembled by shifting longitudinally by an amount corresponding to the length of the respective long holes 26.

As shown in FIG. 3, the fastening portion 18 includes a joint portion 30 formed with the respective long holes 26 and a fixed portion 31 located adjacently to the joint portion 30 on the side of the other end, and the joint portion 30 and the fixed portion 31 are free to rotate with respect to each other about an axis extending in the fore-and-aft direction. The fixed portion 31 is formed with extending portions 32 extending outward in the fore-and-aft direction from the front and the rear portions at the other end thereof. Each extending portion 32 is formed with a bolt hole 33, and is adapted to be screwed to the pillar reinforce 14 by the bolt 17.

The arm guiding member 20 is secured to the arm body 16 side also by spot welding in addition to the aforementioned bolt 27. The arm guiding member 20 includes a first plate-shaped portion 34 having the weld nut 28 secured thereto and fixed to the other end portion 16*c* of the arm body 16, and a second plate-shaped portion 35 to be fixed to the curved portion 16*d* of the arm body 16. The first plate-shaped portion 34 and the second plate-shaped portion 35 are fixed to the arm body 16 by spot welding respectively. The respective plate-shaped portions 34, 35 are connected forwardly of the other end portion 16*c* of the arm body 16 and the connecting portion is provided with the aforementioned catch pin 19 extending substantially in parallel with the stopper pin 21. As shown in FIG. 5, the catch pin 19 is fitted into a holder 37 of a bracket 36 provided on a reinforce of the vehicle body 2 when the slide door 4 is moved to the frontmost position of the movable range. The portion of the second plate-shaped portion 35 projecting from the arm body 16 is formed with a rectangular-shaped square hole 35a. In this embodiment, as shown in FIG. 4, the square hole 35a as the engaging section penetrates in the vertical direction.

As shown in FIG. 5, the reinforce of the vehicle body 2 extends substantially in the fore-and-aft direction, and the upper rail 5 extending substantially in the fore-and-aft direction is provided on the interior side of the reinforce along the outer edge of the upper surface thereof, and the holder 37 is disposed on the front portion of the exterior side of the reinforce on the upper surface thereof together with the bracket. In this embodiment, as shown in FIG. 6, the bracket 36 is formed into a substantially box shape opened in front and the holder 37 is fixed to the back surface thereof. FIG. 6 schematically shows a arrangement state of the upper rail 5 and the bracket 36 for the purpose of description. The holder 37 assumes a substantially cylindrical shape to which the catch pin 19 is fitted. Since the slide door 4 moves toward the front while inclining toward the cabin in the vicinity of the front most point of the movable range, the front end side of the upper rail 5 extends toward the front while inclining toward the cabin. The bracket 36 is disposed so that the back surface is substantially orthogonal to the direction of fore-and-aft movement of the upper arm 8. Accordingly, the impact applied from the upper arm 8 can be efficiently received.

As shown in FIG. 6, the bracket 36 is formed with a substantially square column shaped hook 38 corresponding to the square hole 35a of the arm guiding member 20 of the upper arm 8 so as to project therefrom. The hook 38 as the engaged device includes a proximal portion 38a which projects from the back surface of the bracket 36 in the direction of the fore-and-aft movement of the upper arm 8, and a vertically extending portion 38b extending upward from the distal end of the proximal portion 38a. The vertically extending portion 38b of the hook 38 is disposed so as to be situated substantially below the square hole 35a when the slide door 4 is in the closed state, and the upper arm 8 is located at the front most position in the movable range. Accordingly, the square hole 35a and the hook 38 are adapted to be engaged with each other in case of side collision of the vehicle.

The respective stopper pins 21 are received by a stopper hole of the stopper member provided at a rear end of the upper rail 5. In this embodiment, two of the stopper holes are formed separately corresponding to the respective stopper pins 21. The stopper member formed of rubber comes into abutment with the upper arm 8 when the slide door 4 is moved to the rearmost point of the movable range.

According to the vehicle slide door apparatus 1 as described above, the vertical center portion of the slide door 4 moves toward the center of the cabin in case of side collision of the vehicle, and the slide door 4 is bent substantially into the angular C-shape. At this time, as shown in FIG. 7, the upper portion of the slide door 4 moves downward, and the upper arm 8 is moved downward, whereby the vertically extending portion 38b of the hook 38 of the vehicle body is received in the square hole 35a of the upper arm 8 (see FIG. 6). Subsequently, the movement of the upper arm 8 with respect to the vehicle body is controlled.

In this manner, when the slide door 4 is deformed in case of side collision of the vehicle, the hook 38 formed on the vehicle body 2 so as to project therefrom engages the square hole 35a formed on the upper arm 8, and hence the slide door 4 is arrested by the vehicle body 2. Since the square hole 35a of the upper arm 8 and the hook 38 of the vehicle body 2 are normally in the isolated state, the opening/closing operation of the slide door 4 is not impaired.

Therefore, according to the vehicle slide door apparatus 1 of this embodiment, since the square hole 35a of the upper arm 8 and the hook 38 of the vehicle body 2 engages in case of side collision of the vehicle, the slide door 4 is arrested by the vehicle body 2 side, and the amount of intrusion of the slide door 4 toward the cabin can be reduced.

Accordingly, the safety of the passenger can be improved. Also, the intrusion of the slide door 4 can be controlled effectively without increasing strength of the vehicle body structure of the slide door 4 and the portion near the door. Therefore, reduction of the number of components of the slide door 4 and the vehicle body 2, and the weight can be achieved, whereby reduction of the vehicle weight and the manufacturing cost is achieved correspondingly.

According to the vehicle slide door apparatus 1 of this embodiment, since the hook 38 is formed on the receiving bracket 36 for the catcher pin 19, the components can be shared and hence further reduction of the weight is achieved. Also, since the receiving bracket 36 has a relatively high strength since it is designed to resist an impact of the opening/closing operation of the door, and is advantageous in terms of strength in case of side collision.

Also, since the projecting plate having the catch pin 19 is formed with the square hole 35a, the hole can be formed easily, and deterioration of rigidity and strength of the upper arm itself due to formation of the hole on the arm body 16 can be avoided, whereby it is very advantageous for a practical use.

Although the example in which the present invention is applied to the upper rail 5 and the upper arm 8 is shown in the above-described embodiment, it is also possible to apply the present invention to the lower rail 7 and the lower arm 9, or the center rail 6 and the center arm, as a matter of course.

Although the example in which the square hole 35a is provided on the upper arm 8 as the engaging device and the hook 38 is provided on the vehicle body 2 as the engaged device is shown in the above-described embodiment, it is also possible to provide a hook on the upper arm 8 and the square hole on the vehicle body 2. The combination of the engaging device and the engaged device is not limited to the combination of the hole and the hook, and may be the combination of, for example, a concave and a convex.

Also, although an example in which the hook 38 is formed on the receiving bracket 36 of the catcher pin 19 is shown in the above-described embodiment, it is also possible to form the hook 38 on a panel such as a reinforce of the vehicle body, and other detailed structure can be changed as needed, as a matter of course.

Although the invention has been explained according to the embodiments, it should also be understood that the invention is not limited to the embodiments and that various changes and modifications may be made to the invention from the gist thereof.

What is claimed is:

1. A vehicle slide door apparatus comprising:
a vehicle body with an opening formed on a side portion thereof;
a slide door for opening and closing the opening by moving in a fore-and-aft direction;
a rail extending along the fore-and-aft direction;
an arm having one end guided by the rail in the fore-and-aft direction and the other end fixed to the slide door;
an engaging device provided on one of the arm and the vehicle body; and
an engaged device provided on one of the arm and the vehicle body,
wherein at least one of said engaging device and said engaged device moves to engage with the other of said engaging device and said engaged device by a deformation of the vehicle body in case of side collision of the vehicle, wherein the engaging device is a hole formed on the arm, and the engaged device is a hook formed on the vehicle body so as to project therefrom, and wherein the arm is an upper arm which guides the upper portion of the slide door, and the hook is formed so as to project upward and the hole is disposed upwardly of the hook.

2. A vehicle slide door apparatus comprising:
a vehicle body with an opening formed on a side portion thereof;
a slide door for opening and closing the opening by moving in a fore-and-aft direction;
a rail extending along the fore-and-aft direction;
an arm having one end guided by the rail in the fore-and-aft direction and the other end fixed to the slide door;
an engaging device provided on one of the arm and the vehicle body; and
an engaged device provided on one of the arm and the vehicle body,
wherein at least one of said engaging device and said engaged device moves to engage with the other of said engaging device and said engaged device by a deformation of the vehicle body in case of side collision of the vehicle,
wherein the engaging device is a hole formed on the arm, and the engaged device is a hook formed on the vehicle body so as to project therefrom, and
wherein the hook is formed on a receiving bracket for receiving a catcher pin of the arm.

3. The vehicle slide door apparatus according to claim 2, wherein the arm includes an arm body and a projection plate having the catcher pin and projecting from the arm body, and the projecting plate is formed with the hole.

4. The vehicle slide door apparatus according to claim 1, wherein the hook is formed on a receiving bracket for receiving a catcher pin of the arm.

5. The vehicle slide door apparatus according to claim 4, wherein the arm includes an arm body and a projection plate having the catcher pin and projecting from the arm body, and the projecting plate is formed with the hole.

6. A vehicle slide door apparatus comprising:
a vehicle body with an opening formed on a side portion thereof;
a slide door for opening and closing the opening by moving in a fore-and-aft direction;
a rail extending along a fore-and-aft direction;
an arm having one end guided by the rail in the fore-and-aft direction and the other end fixed to the slide door;
a projection device provided on one of the arm and the vehicle body; and
a reception device provided on one of the arm and the vehicle body,
wherein said projection device and said reception device are arranged and designed such that deformation of the slide door upon vehicle side collision drives at least one of said projection and reception devices from a non-interlocking state into an interlocking state relative to an opposite one of said projection and reception devices, and
wherein said projection and reception devices are free from contact relative to each other until movement of said at least one of said projection and reception devices during the deformation based on vehicle side collision.

7. The vehicle slide door apparatus according to claim 6, wherein the one of said projection device and said reception device provided on the vehicle body is situated below with a spacing from the other of said projection device and said reception device provided on the arm, and achievement of the interlocking state between the projection and reception devices occurs following the deformation of the vehicle body in case of side collision of the vehicle which deformation involves a removal of the spacing as well as placement of the projection device into the reception device.

8. The vehicle slide door apparatus according to claim 6, wherein the reception device is a hole formed on the arm, and the projection device is a hook formed on the vehicle body so as to project therefrom.

9. The vehicle slide door apparatus according to claim 8, wherein the arm is an upper arm which guides the upper portion of the slide door, and the hook is formed so as to project upward and the hole is disposed upwardly of the hook.

10. The vehicle slide door apparatus according to claim 8, wherein the hook is formed on a receiving bracket for receiving a catcher pin of the arm.

11. The vehicle slide door apparatus according to claim 10, wherein the arm includes an arm body and a projection plate having the catcher pin and projecting from the arm body, and the projecting plate is formed with the hole.

12. The vehicle slide door apparatus according to claim 9, wherein the hook is formed on a receiving bracket for receiving a catcher pin of the arm.

13. The vehicle slide door apparatus according to claim 12, wherein the arm includes an arm body and a projection plate having the catcher pin and projecting from the arm body, and the projecting plate is formed with the hole.

14. A vehicle slide door apparatus comprising:
a vehicle body with an opening formed on a side portion thereof;
a slide door for opening and closing the opening by moving in a fore-and-aft direction;
a rail extending along a fore-and-aft direction;
an arm having one end guided by the rail in the fore-and-aft direction and the other end fixed to the slide door,
wherein an engaging device provided on the arm and an engaged device provided on the vehicle body engages in case of side collision of the vehicle, wherein the engaging device is a hole formed on the arm, and the engaged device is a hook formed on the vehicle body so as to project therefrom, and wherein the arm is an upper arm which guides the upper portion of the slide door, and the hook is formed so as to project upward and the hole is disposed upwardly of the hook.

15. A vehicle slide door apparatus comprising:
a vehicle body with an opening formed on a side portion thereof;
a slide door for opening and closing the opening by moving in a fore-and-aft direction;
a rail extending along a fore-and-aft direction;
an arm having one end guided by the rail in the fore-and-aft direction and the other end fixed to the slide door,
wherein an engaging device provided on the arm and an engaged device provided on the vehicle body engages in case of side collision of the vehicle, wherein the engaging device is a hole formed on the arm, and the engaged device is a hook formed on the vehicle body so as to project therefrom, and wherein the hook is formed on a receiving bracket for receiving a catcher pin of the arm.

* * * * *